United States Patent [19]

McEwen

[11] Patent Number: 4,900,438
[45] Date of Patent: Feb. 13, 1990

[54] PUMP MOUNTING FOR A FILTRATION SYSTEM

[75] Inventor: Stephen N. McEwen, Bowling Green, Ohio

[73] Assignee: Henry Filters, Inc., Bowling Green, Ohio

[21] Appl. No.: 202,584

[22] Filed: Jun. 6, 1988

Related U.S. Application Data

[63] Continuation-in-part of Ser. No. 144,058, Jan. 15, 1988.

[51] Int. Cl.⁴ .................. B01D 29/00; F04B 17/00
[52] U.S. Cl. .................. 210/236; 210/416.1; 417/360; 222/333
[58] Field of Search .............. 210/167, 168, 234, 236, 210/416.1, 232; 417/360, 423.15; 222/333

[56] References Cited

U.S. PATENT DOCUMENTS

| | | | |
|---|---|---|---|
| Re. 32,135 | 6/1986 | Creps et al. | 210/260 |
| 3,234,885 | 2/1966 | Englesson | 417/360 |
| 3,427,982 | 2/1969 | Englesson | 417/360 |
| 3,515,495 | 2/1968 | Blum | 417/360 |
| 3,635,606 | 1/1972 | Blum | 417/360 |
| 3,687,576 | 8/1972 | Wickholm et al. | 417/423.15 |
| 4,421,645 | 12/1983 | Creps et al. | 210/400 |
| 4,507,061 | 3/1985 | McEwen et al. | 222/333 |
| 4,661,047 | 4/1987 | Weis | 417/360 |
| 4,715,964 | 12/1987 | Harms | 210/806 |
| 4,726,742 | 2/1988 | Harbison et al. | 417/360 |

Primary Examiner—Richard V. Fisher
Assistant Examiner—Coreen Y. Lee
Attorney, Agent, or Firm—Brooks & Kushman

[57] ABSTRACT

The pump mounting includes vertical guide tracks and horizontal supports whereby a pump can be lowered in a filtration tank along the vertical guide tracks to connect its axial inlet port with an inlet conduit and rotated to connect its radial discharge port with an outlet conduit. Positive pump displacement means are provided to rotate the pump into its operative position in the tank and to release the pump from its operative position for removal from the tank. Cams cooperate between the tracks and the pump mounting frame to rotate to the pump to disconnect its radial discharge port and the outlet conduit in response to lifting the pump from the tank.

19 Claims, 2 Drawing Sheets

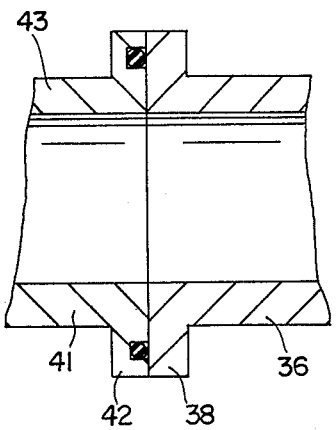
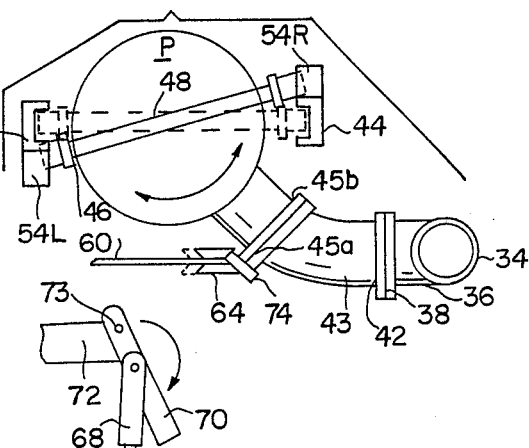
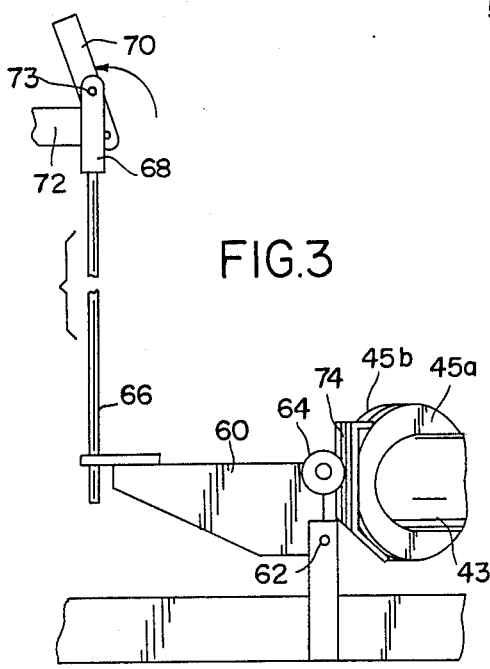
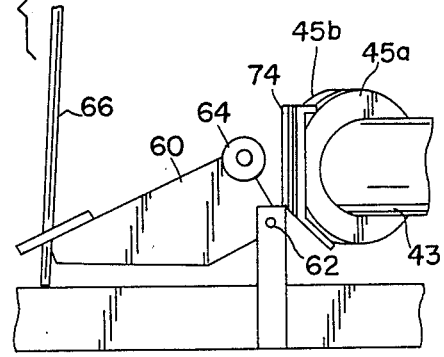

PUMP MOUNTING FOR A FILTRATION SYSTEM

RELATED APPLICATIONS

This application is a continuation-in-part of U.S. Patent Application Ser. No. 144,058, filed Jan. 15, 1988.

BACKGROUND OF THE INVENTION

The present invention relates to a mounting for a pump which facilitates connecting and disconnecting the pump inlet and discharge ports with respective flow inlet and discharge conduits and particularly relates, for example, to a pump mounting for use in a filtration tank forming part of an industrial filtration system for filtering and returning clean coolant to machine tools. The disclosure of U.S. patent application Ser. No. 144,058, filed Jan. 15, 1988, is incorporated herein by reference.

In industrial machining operations, such as metal cutting or grinding, a liquid is typically provided machine tools for purposes of cooling, lubricating, improving cutting qualities and preventing rust. The coolant is usually circulated to individual workstations, e.g., machine tools, grinders, etc., where the coolant additionally serves to flush the machining waste from the workstation for flow to a filtration apparatus, typically a filtration tank common to all of the workstations. One or more filters are conventionally employed in the filtration tank to separate the waste and other contaminants from the coolant. Many different types of filters and arrangements may be used for this purpose and one well-known commercially successful system is manufactured and sold by the assignee hereof, Henry Filters, Inc. of Bowling Green, Ohio. In that system, one or more horizontally disposed filter drums are located in a dirty coolant compartment adjacent the bottom of the tank. A suction is provided to the interior of the filter drums to pull coolant through the filter elements. Filter cake forms on the filter elements and drops or is removed from the filter drums for deposit on the bottom of the tank, where it is removed, for example, by a dragout conveyor.

In that filtration system, there is also provided a clean coolant tank for receiving the clean coolant filtrate. Various types of pumps may be employed to provide the suction to the filter drum and pump the clean filtrate through a header below the level of coolant in the clean coolant compartment back to the machine tools. For example, vertical turbine-type pumps have been employed. However, these types of pumps are bulky, unwieldy and are difficult to install in and remove from the tank because they require disconnection of the mechanical piping connections, such as by unbolting, between the pump and the flow inlet and discharge conduits, as well as disconnection of the electrical connections. Additionally, sufficient headroom above the filtration tank must be provided to accommodate the large vertical extent of that type of pump.

To overcome those, as well as other problems associated with the pumps and their mounting, particularly in industrial filtration systems using a filtration tank, and in accordance with the above-identified patent application, there are provided pumps which may be readily and easily removed from and reinstalled in the filtration tank without necessitating draining the tank, disconnecting or reconnecting pipe couplings, joints and electrical connections or manually closing valves and without the need for substantial headroom and overhead access space. The pumps, as discussed in that application, each have an axial inlet or suction port at its lower end adjacent the pump impeller stage and a pump discharge port which extends generally radially of the pump. As disclosed in the above-identified patent application, one pump embodiment comprises a submersible pump which may be lowered into the tank below the coolant level. The pump inlet port is connected with the suction conduit to the filter simply by lowering the pump onto a suction conduit outlet located in a false bottom in the clean coolant compartment of the filtration tank. The connection between the radial discharge port of the pump and the discharge conduit is provided in various ways as set forth in that application. For example, when the pump is lowered into the tank, the pump discharge head may be disposed in a tank receptor ring mounting a fixed discharge conduit such that coolant flows from the pump inlet port through the discharge head into the discharge conduit of the receptor ring for flow out of the tank to the machine tools.

In another form of the pump disclosed in that prior application, the discharge port of the pump comprises a discharge conduit which projects substantially radially from one side of the pump. To connect the radial discharge conduit of the pump to the discharge conduit of the tank, there is provided, as described in that application, a flexible coupling comprising essentially an expansion joint movable under positive control by pneumatic, hydraulic or mechanical means to effect connection and disconnection between the radial discharge conduit of the pump and the discharge conduit of the tank.

However, in certain installations, an arcuate or elbow-type radial discharge conduit from the pump is provided for connection and disconnection with the fixed discharge conduit of the tank. Consequently, it has been found necessary to provide apparatus and methods for connecting and disconnecting pumps of this type while retaining the benefits and advantages of the pump mounting systems disclosed in the prior application, including the capacity to remove and reinstall the pump by simply raising and lowering the pump, respectively, relative to the tank, without manual connection or disconnection of piping and with minimum headroom.

To accomplish this, and in accordance with the present invention, there is provided a mounting system for a pump of the type having a radially projecting discharge conduit, preferably for use with industrial filtration systems as previously described, which facilitates ready and easy removal and reinstallation of the pump into and out of a coolant filtration tank without draining the tank, manually disconnecting or reconnecting the pipe couplings, joints and electrical connections or manually closing valves and without the need for substantial headroom or overhead access space. For example, in existing installations, there is conventionally provided a header adjacent the bottom of the tank. The header is connected to an outlet conduit for flowing clean coolant from the tank to the machine tools. Such headers have a pipe or conduit adjacent the bottom of the tank for connection to the discharge port of each pump. In new installations, it is oftentimes desirable to provide similar-type pipe or conduit couplings in a similar configuration. Consequently, it has been necessary to develop a mounting system for submersible-type pumps of the type having a radial discharge conduit terminating in a flanged coupling wherein the coupling of the pump may be connected and disconnected to the coupling of the discharge conduit, while at the same time permitting removal and reinstallation of the pump.

More particularly, the pump, preferably a submersible-type pump, is mounted in a frame having a pair of laterally projecting guide pins on each side of the frame for engagement in vertically extending laterally spaced tracks, e.g., channels, disposed within the tank. By disposing the pins in the tracks, the submersible pump can be raised and lowered relative to the tank while maintaining the orientation of the pump about its vertical axis. The submersible pump is of the type having a lower axial inlet port and a radial discharge conduit projecting from the pump as discussed above. Supports are provided at a predetermined elevation along the tracks for engaging the lowermost pair of pins to support the submersible pump adjacent the bottom of the tank. At that support position, the axial inlet port of the pump lies in communication with the suction outlet of the filter drum through an opening in the false bottom in the clean coolant compartment of the filtration tank. However, the radial discharge conduit of the pump is spaced from the discharge conduit of the tank. To connect the pump's radial discharge conduit with the discharge conduit of the tank, the submersible pump is rotated about its vertical axis to locate its radial discharge port into sealing engagement with the discharge conduit. An O-ring-type seal is carried by at least one of the flanges connecting the radial discharge port and the discharge conduit.

To enable rotation of the pump, the tracks have cutouts along opposite sides adjacent each pin such that the pins may be vertically misaligned relative to the tracks and to one side thereof upon rotation of the pump about its vertical axis. To positively rotate the submersible pump about its axis and connect the pump discharge port and the tank discharge conduit, a plate or lever is pivoted to the tank and carries a bearing surface, for example, a roller for engaging a part on the pump. Preferably, the pump part engaged by the roller is a flanged coupling forming part of the pipe elbow of the pump's radial discharge conduit. The flange is spaced substantially from the axis of the pump to maximize the leverage when rotating the pump. The plate is pivoted by an elongated rod pivotally mounted at its lower end to the plate and at its upper end above the tank for movement between overcenter positions relative to a handle. Consequently, when the rod is displaced upwardly, the bearing surface engages the pump flange to rotate the pump about its vertical axis to engage and seal the flanged couplings of the radial discharge port and the discharge conduit. The overcenter position of the handle on the rod locks the two flanges one to the other in sealing engagement.

To disconnect the pump, the handle is moved overcenter to pivot the plate in a direction removing the roller from engagement with the pump flange, thereby enabling the pump for pivotal movement about its vertical axis. To move the pump about its vertical axis, the cutouts in the track are formed by upwardly and laterally outwardly inclined cam surfaces. Thus, when the pump is raised, the cam surfaces guide the pins into vertical alignment within the tracks, thus rotating the pump in a direction disconnecting the radial discharge port of the pump from the tank discharge conduit. Once the pins lie in vertical registry in the tracks, the pump may be removed from the tank. Also, by raising the pump, the pump inlet port is disconnected from the suction conduit outlet in the false bottom of the tank.

In a preferred embodiment in accordance with the present invention, there is provided apparatus for mounting a pump in a liquid filtration tank comprising a tank for containing liquid and having an outlet conduit. A filter is provided in the tank and a suction conduit communicates with the filter and applies a suction to the filter. A pump is also provided having an inlet port and a discharge port together with means mounting the pump for movement between an inoperative position removed from the tank and an operative position in the tank with the suction conduit and the pump inlet port connected one to the other and the pump discharge port and the outlet conduit connected one to the other for pumping liquid filtrate from the filter into the outlet conduit. The mounting means include means carried by the tank and the pump cooperable to guide the pump for movement in the tank in two discrete directions to connect the pump discharge port and the outlet conduit one to the other in response to movement of the pump into the operative position.

In a further preferred embodiment in accordance with the present invention, there is provided apparatus for mounting a pump in a liquid filtration tank comprising a tank for containing liquid and having an outlet conduit. A filter is provided in the tank and a suction conduit communicates with the filter for applying a suction to the filter. There is also provided a pump and means mounting the pump for movement between an operative position in the tank for pumping liquid filtrate from the filter through the suction conduit and into the outlet conduit and an inoperative position removed from the tank. The mounting means include means carried by the tank and the pump cooperable to guide the pump for rotational movement in the tank toward its operative position and also includes means for positively rotating the pump in the tank toward the operative position.

In a still further preferred embodiment in accordance with the present invention, there is provided apparatus for mounting a pump in a liquid filtration tank comprising a tank for containing liquid and having an outlet conduit and a filter in the tank and a suction conduit in communication with the filter for applying a suction to the filter. The pump has an outlet for connection to the outlet conduit. Means are provided for mounting the pump for movement between an operative position in the tank for pumping liquid filtrate from the filter through the suction conduit and into the outlet conduit and an inoperative position removed from the tank. The mounting means include means carried by the tank and the pump cooperable to guide the pump for rotational movement in the tank in response to movement of the pump from its operative position toward its inoperative position thereby to disconnect the pump outlet and the outlet conduit.

Accordingly, it is a primary object of the present invention to provide novel and improved apparatus and methods for installing a pump in a tank and removing the pump from the tank, the pump being of the type having a radial discharge conduit.

These and further objects and advantages of the present invention will become more apparent upon reference to the following specification, appended claims and drawings.

BRIEF DESCRIPTION OF THE DRAWING FIGURES

FIG. 2 is a schematic plan view of the pump mounting and pump illustrating part of a mechanism hereof enabling rotation of the tank into its operative connected position;

Figure 1:
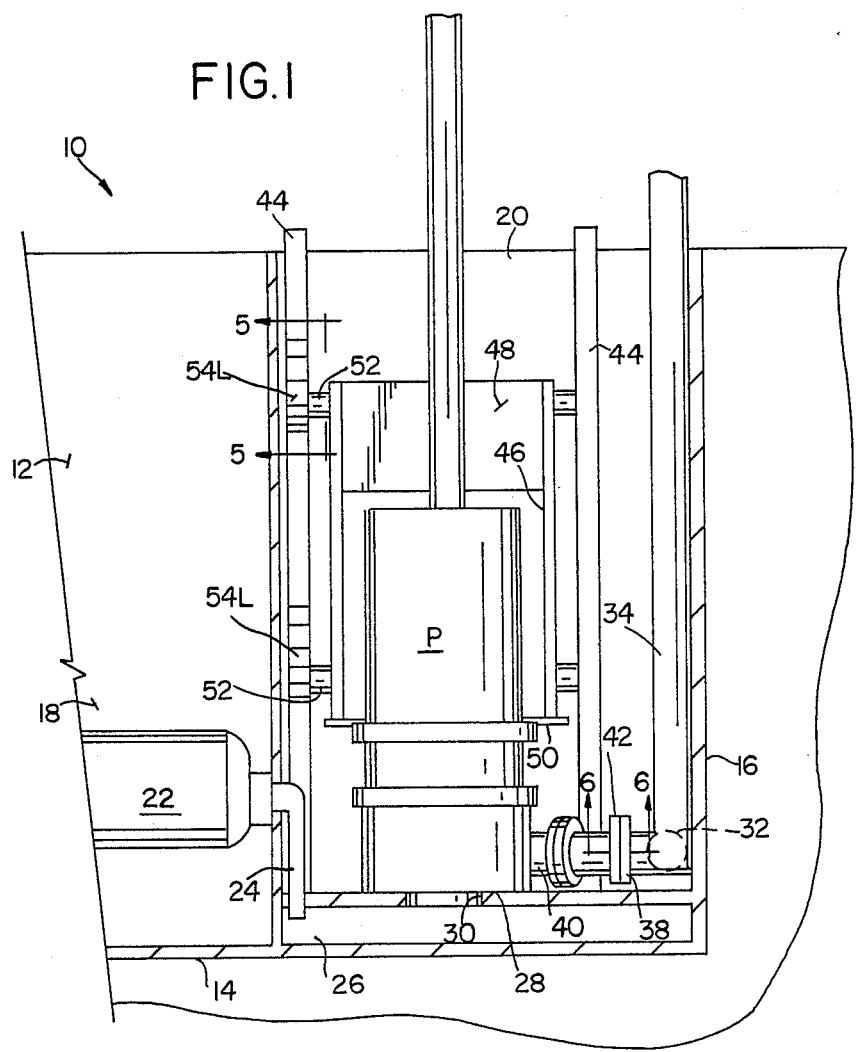
FIG. 1 is a fragmentary cross-sectional view of a portion of a tank, for example, a filtration tank, illustrating a mounting for a pump, the pump being illustrated in its operative connected condition.
Figure 5:
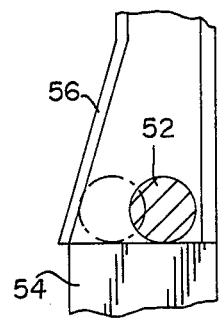

FIGS. 3 and 4 are fragmentary, enlarged side elevational views of the mechanism for rotating the pump into the operative position and releasing it for disconnection; and FIGS. 5 and 6 are cross-sectional views of the apparatus illustrated in FIG. 1 taken generally about on lines 5—5 and 6—6, respectively, in FIG. 1.

DETAILED DESCRIPTION OF THE DRAWING FIGURES

Reference will now be made in detail to the present preferred embodiment of the invention, an example of which is illustrated in the accompanying drawings.

Referring now to FIG. 1, there is illustrated a settling or filtration tank, generally designated 10, set into a pit disposed below floor level. Tank 10 is generally rectilinear in configuration, having side and bottom walls 12 and 14, respectively, and an end wall 16, the opposite end wall, not shown, of the tank being inclined to enable a dragout conveyor to remove solid particles from the bottom of the filtration tank. As set forth in my prior application, the tank is preferably comprised of two discrete compartments, a dirty or contaminated coolant compartment designated 18 for receiving dirty coolant from machine tool workstations, not shown, and a clean coolant compartment designated 20 which contains clean filtered coolant. In the dirty coolant compartment 18, there is provided one or more filter drums 22 for filtering the dirty coolant, whereby clean coolant may be supplied to the machine tools. The filter per se forms no part of the present invention and suffice to say that a suction is drawn on the inside of filter 22 by the pump P. The suction is provided through a conduit 24 in communication with the interior of filter drum 22 and also with a lower chamber 26 forming part of the clean coolant compartment 20 but divided from the upper part thereof by a false bottom 28 having a suction discharge outlet opening 30. The clean coolant compartment also carries a header 32 having an upstanding outlet conduit 34 for supplying clean coolant to the machine tools. The header 32 has one or more, depending on the number of pumps employed, fixed outlet pipes 36 terminating in flanges 38.

Preferably, pump P is of the submersible type having a lower axial inlet port and a radial discharge conduit 40 terminating in a discharge port 41 having a flange 42 for coupling with the flange 38 whereby the discharge port 41 of the pump may be connected to the outlet pipe 36 of the header. The conduit 40 includes an elbow pipe 43 connected at flange 45a to the flange 45b of a radial discharge conduit section 47 forming part of the exit volute of the pump. Thus, the pump includes conduit 40 and discharge port 41 and which conduit 40 and port 41 are removable with the pump from the tank and reinstalled with the pump, as will be seen from the ensuing description.

It will also be appreciated that pump P applies a suction to the interior of the filter drum 22 through the opening 30, lower compartment 26 and conduit 34 causing clean coolant to flow from the interior of drum 22 through the pump into header 32 for flow through conduit 34 to the machine tools. Pump P is mounted in the clean coolant compartment in accordance with the present invention in a manner which will now be described.

Clean compartment 20 is provided with a pair of vertically extending tracks 44 secured to the tank, by means not shown. Preferably, the tracks comprise channels opening inwardly toward one another. Pump P is mounted to and carried for movement by a frame comprised of vertical side members 46, connected at their upper ends by a crossbeam 48 and to the pump at their lower ends by connecting plates 50. A pair of vertically spaced pins 52 are secured to members 46 and project laterally outwardly from adjacent their upper and lower ends, respectively, for engagement in tracks 44. Consequently, pump P is movable vertically into and out of the tank by raising and lowering the pump, the tracks and pins cooperating to maintain the angular orientation of the pump about its center vertical axis for reasons which will become apparent.

It will be appreciated that the pump is of the type that has a lower axial inlet port such that when the pump is lowered into the tank as illustrated in FIG. 1, the pump inlet port lies in communication with the opening 30 to suction the interior of the filter drum 22 via compartment 26 and conduit 24. As best illustrated in FIG. 1, each of the tracks is provided with an interior horizontal support 54 at an elevation enabling the lowermost pins of the pump support frame to engage support 54 and support pump P with the axial inlet of the pump in communication with the suction outlet opening 30. Thus, instead of being supported by false floor 28, pump P is supported in operative position by the lower pins engaging the horizontal supports 54.

Also illustrated in FIG. 5 is a cam surface 56. Cam surfaces 56 are formed along one side of each track at elevations corresponding to the elevation of pins 52 when the pump is supported on supports 54. Thus, two cam surfaces 54L are provided on one side of the left-hand track 44 as viewed in FIGS. 1 and 2 while cam surfaces 54R are provided on the opposite side of the righthand track 44 as viewed in FIGS. 1 and 2. By angling the cam surface 56 downwardly and outwardly, the pins may be displaced horizontally with the lowermost pins being displaced along supports 54 such that the pump including conduit 40 and port 41 may be rotated about its vertical axis to connect and disconnect the pump discharge port 41 and the fixed outlet conduit 36.

Turning now to FIGS. 3 and 4, there is provided a mechanism for positively rotating the pump into its operative connected position illustrated in FIGS. 1 and 2 to connect the pump's radial discharge port and the fixed outlet conduit 36 of the tank. Such mechanism includes a plate or lever 60 pivoted at one end about a pin 62 secured to the tank. Lever 60 carries a bearing surface, preferably a roller, 64. The opposite end of plate 60 is pivotally secured to the lower end of a vertically extending rod 66. The upper end of rod 66 terminates in a clevis 68 pivotally connected to a handle 70 which, in turn, is pivotally connected to a fixed support 72 above and remote from the tank. Consequently, by rotating handle 70 about pivot 73, for example, in the direction of the arrow in FIG. 3, rod 66 is raised, causing plate 60 to pivot roller 64 from left to right in drawing FIG. 3 to engage a part of the pump, in this instance, an abutment 74 carried by flanges 45. Continued rotation of handle 70 in the direction of the arrow illustrated in FIG. 3 causes roller 64 to rotate the pump P about its vertical axis. Additionally, the lower pins 52 are displaced along support surfaces 54 and all pins are displaced from registration in the vertical tracks to vertical misalignment therein to one side adjacent cam surfaces 56. By moving handle 70 into the overcenter position illustrated in FIG. 3, the flange 42 of the discharge conduit is brought into engagement with flange 38 carried by the fixed conduit 36, sealing the pump discharge port and outlet conduit 36 one to the other.

Consequently, it will be appreciated that the pump is thus disposed in the operative position as illustrated in FIG. 1 by first lowering the pump into the tank for guided movement along the tracks such that it engages support surfaces 54 and then rotating the pump about a vertical axis to connect the discharge port 41 and outlet conduit 36. By maintaining handle 70 in its overcenter position, roller 64 is maintained against flange 45 to maintain discharge port 41 and discharge conduit 36 sealed one to the other and hence maintain the pump in its operative position. It will also be appreciated that suitable lifting means, not shown, for example, an overhead crane may be used to lift and lower the pump. Also, the lift means may carry all, part of, or none of the weight of the pump and frame when handle 70 is operated by rotating the pump into final operative position. Preferably, however, at least part of the weight of the pump is carried by the lifting means when the pump is rotated, thereby facilitating rotation of the pump by means of the handle 70.

To disconnect the pump and remove it from the tank, handle 70 is rotated, for example, in the direction of the arrow seen in FIG. 4, thereby lowering rod 66 and pivoting plate 60 to move roller 64 away from the abutment 74. The pump may then be lifted to effect disconnection. More particularly, when lifting pump P, pins 52 bear against cams 56 and rotate the pump, as it is being raised, in a direction to align or register the pins in tracks 44. This camming action also displaces the pump discharge port 41 away from the outlet conduit 36. The pump may then be lifted from the tank. It will be appreciated that the movement of the pump first in a combined rotary and upward direction disconnects both the discharge port from the outlet conduit and the axial inlet port from the suction outlet opening 30. This combined rotary-linear movement is followed by linear vertical movement to remove the pump from the tank.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Apparatus for mounting a pump in a liquid filtration tank, comprising:
   a tank for containing liquid and having an outlet conduit;
   a filter in said tank and a suction conduit in communication with said filter for applying a suction to said filter;
   a pump having a vertical axis, an inlet port and a discharge port; and
   means mounting said pump for movement between an inoperative position removed from said tank and an operative position in said tank with said suction conduit and said pump inlet port connected one to the other and said pump discharge port and said outlet conduit connected one to the other for pumping liquid filtrate from said filter into said outlet conduit;
   said mounting means including cooperable means carried by said tank and said pump cooperable to guide said pump for movement in said tank in a vertical direction and in a horizontally rotational direction about the vertical axis of the pump to connect said pump discharge port and said outlet conduit one to the other in response to movement of said pump into said operative position.

2. Apparatus according to claim 1 wherein said mounting means includes means carried by said tank and said pump cooperable to guide said pump for movement in said tank in said directions to disconnect said pump discharge port and said outlet conduit in response to movement of said pump toward said inoperative position.

3. Apparatus according to claim 1 wherein said mounting means includes means carried by said tank and said pump cooperable to guide said pump for movement in said tank in said directions to disconnect said suction conduit and said pump inlet port one from the other and disconnect said pump discharge port and said outlet conduit one from the other in response to movement of said pump toward said inoperative position.

4. Apparatus according to claim 1 including means for positively moving said pump in said tank in said horizontally rotational direction to connect said pump discharge port and said outlet conduit one to the other.

5. Apparatus according to claim 1 wherein said cooperable means guides said pump for rotation relative to said tank in one of said directions, said pump discharge port and said outlet conduit being connected one to the other in response to rotation of said pump in said horizontally rotational direction.

6. Apparatus according to claim 1 wherein said cooperable means guides said pump for linear movement in one of said directions, said suction conduit and said pump inlet port being connected one to the other in response to linear movement of said pump in said vertical direction.

7. Apparatus according to claim 6 wherein said cooperable means guides said pump for rotation in the horizontally rotational direction, said pump discharge port and said outlet conduit being connected one to the other in response to rotation of said pump in said horizontally rotational direction.

8. Apparatus according to claim 7 including means for positively rotating said pump in said tank in said horizontally rotational direction to connect said pump discharge port and said outlet conduit one to the other.

9. Apparatus according to claim 8 wherein said rotating means includes an element pivotally carried by said tank and having a pump engaging portion spaced from said pivotal connection with said tank and means operable externally of said tank for pivoting said element to engage said pump portion and rotate said pump in said horizontally rotational direction.

10. Apparatus for mounting a pump in a liquid filtration tank, comprising:

a tank for containing liquid and having an outlet conduit;

a filter in said tank and a suction conduit in communication with said filter for applying a suction to said filter;

a pump having a vertical axis;

means mounting said pump for movement between an operative position in said tank for pumping liquid filtrate from said filter through said suction conduit and into said outlet conduit and an inoperative position removed from said tank;

said mounting means including means carried by said tank and said pump cooperable to guide said pump for rotational movement in said tank toward its operative position; and means for positively rotating in a horizontal plane said pump about its vertical axis in said tank toward said operative position.

11. Apparatus according to claim 10 wherein said rotating means is located in said tank, and means remote from said tank for operating said rotating means to rotate said pump.

12. Apparatus according to claim 10 wherein said pump has an axial inlet port and a side outlet port, said mounting means including second means carried by said tank and said pump cooperable to guide said pump for substantially linear movement in the direction of the axis of said inlet port to connect said inlet port and said suction conduit one to the other when said pump is moved toward its operative position, the first mentioned guide means being responsive to said rotational pump movement to connect said side outlet port and said outlet conduit one to the other when said pump is moved toward it's operative position in said tank.

13. Apparatus according to claim 12 wherein said first guide means and said second guide means cooperate to enable movement of said pump in said linear direction followed by movement of said pump in said rotational direction in response to movement of said pump in said tank toward said operative position.

14. Apparatus according to claim 13 wherein said first guide means includes a generally vertically extending track carried by said tank and a follower carried by said pump engaging said track, said second guide means including a generally horizontally extending support for engagement by said follower for supporting said pump for generally horizontal movement therealong in response to rotation of said pump.

15. Apparatus according to claim 13 wherein said first guide means includes a pair of laterally spaced generally vertically extending tracks upstanding in said tank and a pair of followers on opposite sides of said pump for engaging said tracks, said second guide means including for each track a generally horizontally extending support for engagement by one of said followers for supporting said pump for rotational movement thereof whereby, upon rotation of said pump, said pump followers are misaligned with the vertically extending tracks.

16. Apparatus according to claim 15 wherein said rotating means includes an element pivotally carried by said tank and having a pump engaging portion spaced from said pivotal connection with said tank and means operable externally of said tank for pivoting said element to engage said pump portion and rotate said pump in said one direction.

17. Apparatus according to claim 10 wherein said pump has an outlet port connected to said outlet conduit in the operative position of said pump, said mounting means including means carried by said tank and said pump cooperable to guide said pump for rotational movement in said tank upon movement of said pump from it's operative position toward it's inoperative position thereby to disconnect said outlet port and said outlet conduit.

18. Apparatus according to claim 17 wherein said mounting means includes a generally vertically extending track carried by said tank and a follower carried by said pump in engagement with said track, said pump being movable toward said operative position with said follower engaging said track prior to being rotated toward it's operative position and being movable toward it's inoperative position with said follower engaging said track after being rotated from it's operative position.

19. Apparatus for mounting a pump in a liquid filtration tank, comprising:

a tank for containing liquid and having an outlet conduit;

a filter in said tank and a suction conduit in communication with said filter for applying a suction to said filter;

a pump having a vertical axis, an outlet for connection to said outlet conduit; and means mounting said pump for movement between an operative position in said tank for pumping liquid filtrate from said filter through said suction conduit and into said outlet conduit and an inoperative position removed from said tank;

said mounting means including means carried by said tank and said pump cooperable to guide said pump for rotational movement in a horizontal plane about its vertical axis in said tank in response to movement of said pump from its operative position toward its inoperative position thereby to disconnect said pump outlet and said outlet conduit.

* * * * *